(12) United States Patent
Abadi et al.

(10) Patent No.: US 9,733,905 B1
(45) Date of Patent: Aug. 15, 2017

(54) EMBEDDED LOCATION AWARENESS IN UML MODELING FOR MOBILE AND IOT DEVELOPMENT

(71) Applicant: International Business Machines Corporation, Armink, NY (US)

(72) Inventors: Aharon Abadi, Petach Tikva (IL); Moria Abadi, Petach Tikva (IL); Yael Dubinsky, Haifa (IL); Mordechai Nisenson, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/075,232

(22) Filed: Mar. 21, 2016

(51) Int. Cl.
*G06F 9/44* (2006.01)
*H04L 12/24* (2006.01)
*H04L 29/08* (2006.01)

(52) U.S. Cl.
CPC .............. *G06F 8/35* (2013.01); *H04L 41/145* (2013.01); *H04L 41/22* (2013.01); *H04L 67/18* (2013.01)

(58) Field of Classification Search
CPC ........ G06F 8/35; G06F 8/10; G06F 17/30908; G06F 8/30; G06F 8/73
See application file for complete search history.

(56) References Cited

U.S. PATENT DOCUMENTS

| | | | | |
|---|---|---|---|---|
| 7,340,728 B2 * | 3/2008 | Kutter | ............... | G06F 17/30908 707/E17.122 |
| 7,516,481 B2 * | 4/2009 | Fujikura | ................... | G06F 8/10 717/149 |
| 9,563,408 B1 * | 2/2017 | Bartlett | ..................... | G06F 8/30 |
| 2002/0111965 A1 * | 8/2002 | Kutter | ............... | G06F 17/30908 715/211 |
| 2005/0125775 A1 * | 6/2005 | Fujikura | .................... | G06F 8/10 717/119 |
| 2013/0139164 A1 * | 5/2013 | Balko | ....................... | G06F 8/35 718/102 |

(Continued)

OTHER PUBLICATIONS

Johan Lilius et al.; vUML a Tool for Verifying UML Models; 1999 IEEE; 4 pages; <http://ieeexplore.ieee.org/stamp/stamp.jsp?arnumber=802301>.*

(Continued)

*Primary Examiner* — Thuy Dao
*Assistant Examiner* — Cuong V Luu

(57) ABSTRACT

According to an aspect of some embodiments of the present invention there is provided a computer implemented method of automatically generating and storing a data structure for displaying a Unified Modeling Language (UML) model of behavior of a network of computing devices, the behavior dependent on location of the computing devices, comprising: creating a UML model comprising a plurality of line charts arranged in parallel to a time indicating axis, adding to the displayed UML model a plurality of connectors indicating communication between two entities, where a distance between each two line charts of the plurality of line charts in the UML model maps a geographical distance therebetween, and wherein the distance and the value and the plurality of connectors are editable according to at least one user input indicative of a selection of an area of the displayed UML model.

11 Claims, 5 Drawing Sheets

(56) References Cited

U.S. PATENT DOCUMENTS

2014/0172500 A1\* 6/2014 Schimmelpfennig ..... G06F 8/10
    705/7.29
2014/0351312 A1 11/2014 Lu et al.

OTHER PUBLICATIONS

Prasanta Bose; Automated Translation of UML Models of Architectures for Verification and Simulation Using SPIN; 1999 IEEE; 9 pages; <http://ieeexplore.ieee.org/stamp/stamp.jsp?rnumber=802135>.\*

Simona Bernardi et al.; From UML Sequence Diagrams and Statecharts to analysable Petri Net models; 2002 ACM; pp. 35-45; <http://dl.acm.org/citation.cfm?id=584376>.\*

Howard Foster et al.; Model-based Verification of Web Service Compositions; 2003 IEEE; 10 pages; <http://ieeexplore.ieee.org/stamp/stamp.jsp?arnumber=1240303>.\*

Hung Ledang et al.; Contributions for Modelling UML State-Charts in B; 2002 Springer; pp. 109-127; <https://link.springer.com/chapter/10.1007/3-540-47884-1_7>.\*

Chun Ouyang et al.; Translating Standard Process Models to BPEL; 2006 Springer; pp. 417-432; <https://link.springer.com/chapter/10.1007%2F11767138_28>.\*

\* cited by examiner

EMBEDDED LOCATION AWARENESS IN UML MODELING FOR MOBILE AND IOT DEVELOPMENT

BACKGROUND

The present invention, in some embodiments thereof, relates to a system and method for modeling location dependent behavior of computing devices and, more specifically, but not exclusively, to displaying a Unified Modeling Language (UML) location dependent behavioral model, and automatically generating a source code from the model.

SUMMARY

According to an aspect of some embodiments of the present invention there is provided a computer implemented method of automatically generating and storing a data structure for displaying a Unified Modeling Language (UML) model of behavior of a network of computing devices, the behavior dependent on location of the computing devices, comprising: creating a UML model comprising a plurality of line charts arranged in parallel to a time indicating axis, displaying the UML model in a graphical user interface (GUI) displayed on a screen, setting a plurality of values along each of the line charts, wherein each one of the values indicative of a computer action, adding to the displayed UML model a plurality of connectors, each one of the plurality of connectors connects a pair of line charts selected from the plurality of line charts, each one of the plurality of connectors is indicative of a message transmitted between two entities represented by respective the pair, wherein a distance between each two line charts of the plurality of line charts in the UML model maps a geographical distance therebetween, and wherein the distance and the value and the plurality of connectors are editable according to at least one user input indicative of a selection of an area of the displayed UML model.

Optionally, each one of the plurality of line charts models the behavior of a corresponding computing device from the network of computing devices.

Optionally, each one of the computer action comprises at least one member of a group of computer events occurring within the corresponding computing device, consisting of: a software event, a hardware event, a computer message received from another computing device, a computer message sent to another computing device.

Optionally, wherein the display lines may be solid lines, dotted lines, dashed lines, bold lines, and/or other types of lines, wherein each type of line represents one or more of a plurality of interactions comprising voice messaging, text messaging, video messaging, pre defined alert messages, two way voice calls, two way video calls, group calls, push to talk calls, and/or any other type of one way and/or two way communication.

Optionally, further comprising automatically generating and storing the data structure wherein the data structure is configured to store digital representation of the plurality of line charts, the distance, the plurality of connectors, and the values.

Optionally, the UML model is an extension to at least one modeling language selected from a group of modeling languages consisting of: Systems Modeling Language (SysUML), Open Management Group Systems Modeling Language (OMG SysUML), Specification and Description Language (SDL), Extended Enterprise Modeling Language (EEML), and any other software or computer system modeling language.

According to some embodiments of the present invention there is provided a computer implemented method for automatically generating a source code from a data structure configured to store a UML location dependent behavioral model, comprising: receiving a data structure configured to display a Unified Modeling Language (UML) model of behavior of a plurality of computing devices, the data structure comprising: for each computing device a location of the computing device, at least one line chart, at least one initial computer action, at least one computer event, and at least one secondary computer action, identifying at least one unique combination of the location, initial computer action, and computer event, automatically generating at least one rule such that for each the unique combination wherein the computing device is changed to a corresponding secondary computer action, and generating from the at least one rule at least one software source code comprising computer instructions to execute the secondary computer action when the combination occurs.

Optionally, the initial computer action, the secondary computer action, and the computer event comprises the computing device performing a computer activity selected from at least one member of a group consisting of: sending a computerized messaging to another computing device, receiving a computerized messaging from another computing device, a software event occurring in the computing device, and a computer hardware event occurring in the computing device.

Optionally, each the computerized messaging comprises at least one member of a group consisting of: voice messaging, text messaging, video messaging, pre defined alert messages, two way voice calls, two way video calls, group calls, push to talk calls, any other type of one way or two way computer communication, and any computations associated with the computer communication.

Optionally, the data structure is adopted to store a plurality line charts, each the line chart associated with a computing device.

Optionally, a value of the line chart indicates a computer action and a vertical offset of the line chart indicates a geographical location.

Optionally, the data structure is adopted to store a plurality lines connecting between a pair of line charts, each the connecting line is indicative of computer messaging between the pair.

Optionally, a computer program is generated from the at least one software source code.

According to some embodiments of the present invention there is provided a system to automatically generate and store a data structure for displaying a Unified Modeling Language (UML) model of location dependent behavioral of a network of computing devices, comprising: a graphical user interface (GUI) displayed on a screen for communicating with a user, one or more non-transitory computer-readable storage medium, one or more display devices for presentation of the GUI, one or more user input devices, code instructions stored on at least one of the one or more storage mediums, one or more processors for executing the code instructions coupled to the one or more storage mediums, the code instructions comprising: code instructions to display a UML location dependent model, the model comprising a time axis, a distance axis, and user input, code instructions to receive the user input, code instructions wherein a distance along the distance axis between each two the line charts maps a geographical distance therebetween, and code instructions to allow a user to edit and store the UML location dependent model in a data structure.

Optionally, the user input comprising a plurality of line charts, a plurality of values along each of the plurality of line charts, a plurality of connectors between pairs of the line charts, a scale of the time axis, and a scale of the distance axis, Optionally, the user input may be received via the GUI or from a data structure stored in a computer memory.

Optionally, user input device comprises a device selected from at least one member of a group consisting of: a touch screen, a mouse, a trackball, a keyboard, a touch screen implemented keyboard, and any other computer input device.

Optionally, each of the plurality of line charts the values along the plurality of line charts models a computer action of a corresponding computing device from a network of interconnected computing devices.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
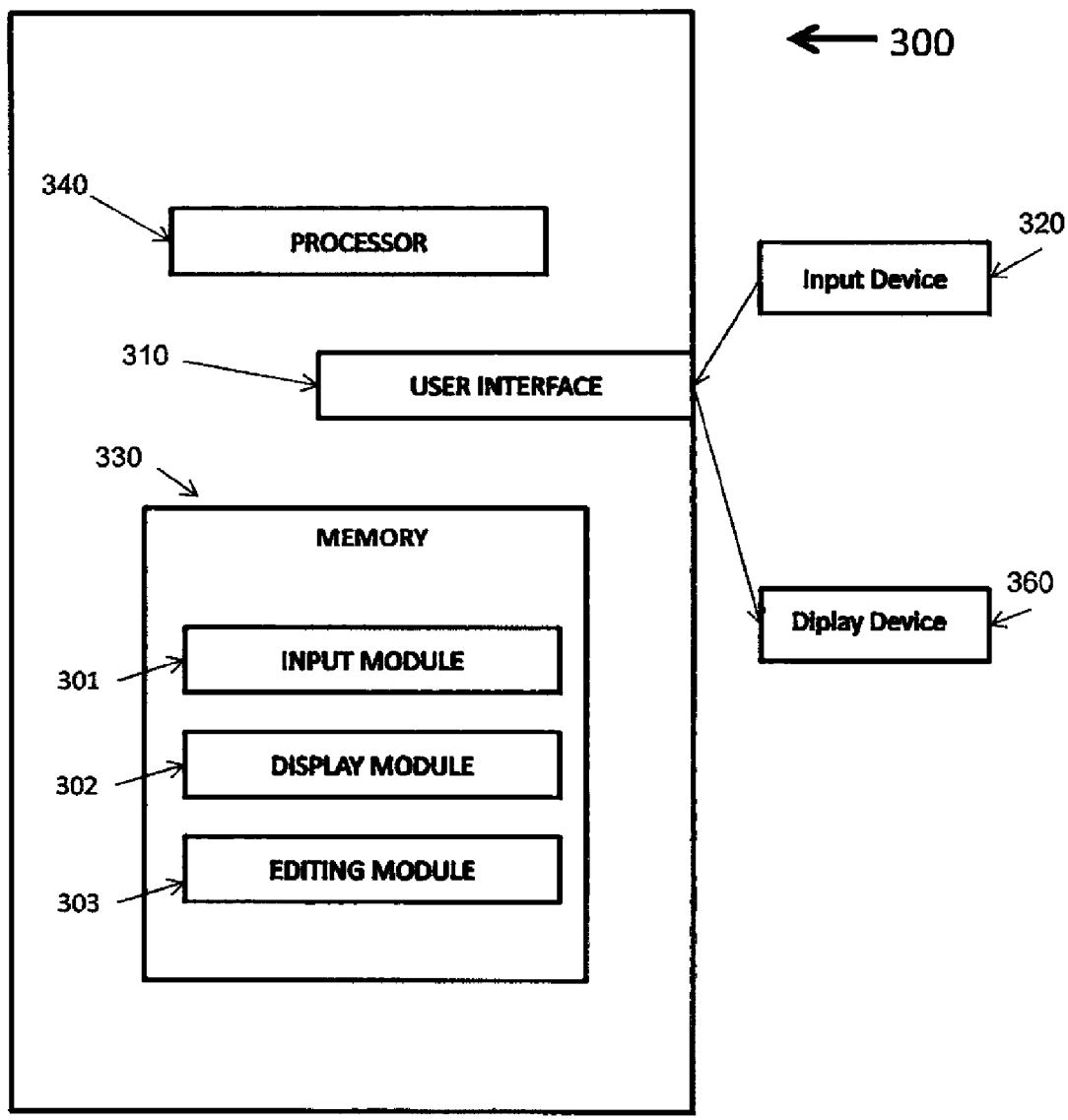
FIG. 1 is a schematic illustration of an exemplary system for generating a display of a UML location dependent behavioral model, according to some embodiments of the present invention.

The present invention, in some embodiments thereof, relates to a system and method for modeling location dependent actions of computing devices and, more specifically, but not exclusively, to generating and displaying a Unified Modeling Language (UML) location dependent model, and automatically generating a source code from the model.

UML modeling is a tool used in software development to both model complex software systems, and to automatically generate code from the model. UML can model system various aspects of behavior, for example timing diagrams, sequence diagrams, state machine diagrams, etc. Creating a UML model is a discrete stage of the development process, usually performed after a specification has been approved and before writing software code. The value of the UML model is expressing graphically the system requirements, which is more easily comprehended than a written description or code. In this way a team of developers are able to achieve a common understanding of the functionality they are expected to implement before writing software code.

With the advent of devices having location tracking functionalities, computing devices may execute actions depending on geographical location. For example, smart phones, GPS devices, and Internet of Things (IoT) are all capable of executing location dependent actions. The current UML model does not have a facility for expressing location as a factor in location dependent methodology. Commonly, location aware devices are connected to a computer network, for example the internet, and interact with other location aware devices. UML has no facilities for modeling the behavior of location dependent networked interactions between computing devices.

According to some embodiments of the current invention, there are provided a system and method for modeling location dependent behavior of networked computing devices, and automatically generating a source code that implements the modeled behavior. The model may be displayed on a computer screen, and may depict at least one computing device, the location of the device, and how the actions executed by the device are affected by location. For example, each device may be depicted by a line chart, where the location of the depicted device is indicated by text and/or by the location of the line chart within the model. Line charts may also depict location of objects, and events or actions related to the objects. The actions of computing devices and objects may be represented by a value displayed in the corresponding line chart. Interaction between computing devices may be depicted by lines between a pair of line charts.

For example, the model may depict the location of several Smartphones with line charts along a vertical axis, and depict a store running a sale with a specific location relative to the Smartphones. A remote video server is also depicted by a line chart. The model may show by connecting lines between specific line charts how the video server only sends a message about a sale to Smartphones within 100 meters of the store.

The models will allow teams of programmers to agree on implementation details for interworking of various networked computing devices prior to coding. The agreement among a team prior to coding reduces the chances of embedded errors in the code. In some embodiments of the current invention, source code may be generated directly from the model, further reducing investment of time and human resources in software source code development.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a schematic illustration of an exemplary computing system for generating and displaying a location dependent UML behavioral model, according to some embodiments of the present invention.

A location dependent UML model graphically presents behavior of computing devices where each modeled computing device has a designated location, and the actions are executed depending on a current location. Each computing device may execute one or more actions in response to a location indicating message from another device and/or internal event(s), for example a hardware or software event indicative of a location or location change. The model depicts how specific actions are triggered in response to location data.

According to some embodiments of the current invention, each computer device is modeled by a line chart, for example in a manner similar to a UML timing model. Each line chart displays a set of discrete values along a time axis, where each discrete value depicts a computer action. Lines connecting line charts may model computer communication between a pair of computing devices. The location of each computing device may be modeled by the position of the line chart, for example a vertical offset of a line chart within the model may indicate a specific location or distance from a location.

System 300 comprises a user interface (UI) 310 for receiving and sending files and data to and from a user, a non-transitory memory 330 for storing code instructions and data, for, one or more processor(s) 340, and one or more display devices 360.

Optionally, UI 310 may be a Graphical User Interface (GUI) or a different human-machine interfaces, for example a text interface and/or audio interface. The GUI may present one or more users a visual interface displayed on a screen coupled with input device 320. Input device 320 may be a keyboard, touch screen, a pointing device and/or any other computer input device.

Optionally, user input may be received from an input device 320, from a data structure located at networked location, and/or from a data structure stored within memory 330. Optionally, user input may comprise a data structure, graphical input, and/or text input.

Memory 330 stores code. The code instructions stored in memory 330 are functionally divided into modules, wherein a module refers to a plurality of program instructions and related data structures stored in a non-transitory medium to be executed by a processor. The code instructions stored in memory 330 comprises an input module 301, a display module 302, and an editing module 303.

Input module 301 is adapted to receive graphical and text user input from user interface 310. Optionally, user input comprises instructions to move or create more than one line chart, more than one value along each of the line charts, at least one connector between at least one pair of line charts, a scale of a time axis, and a scale of a distance axis.

Display module 302 is adapted to instruct displaying a UML location dependent model, on display device 360. As shown in on display device 360 a UML location dependent model. The UML location dependent model comprises user input, a time axis, and a location axis. Optionally the more than one line charts are displayed parallel to the time axis, and arranged vertically along the distance axis. Optionally, a value displayed on a line chart models a computer action of the modeled computer device.

Editing module 303 is adapted to receive a user input indicative of user instructions to edit a displayed UML location dependent model, and to store in a data array the edited UML location dependent model.

Figure 2:
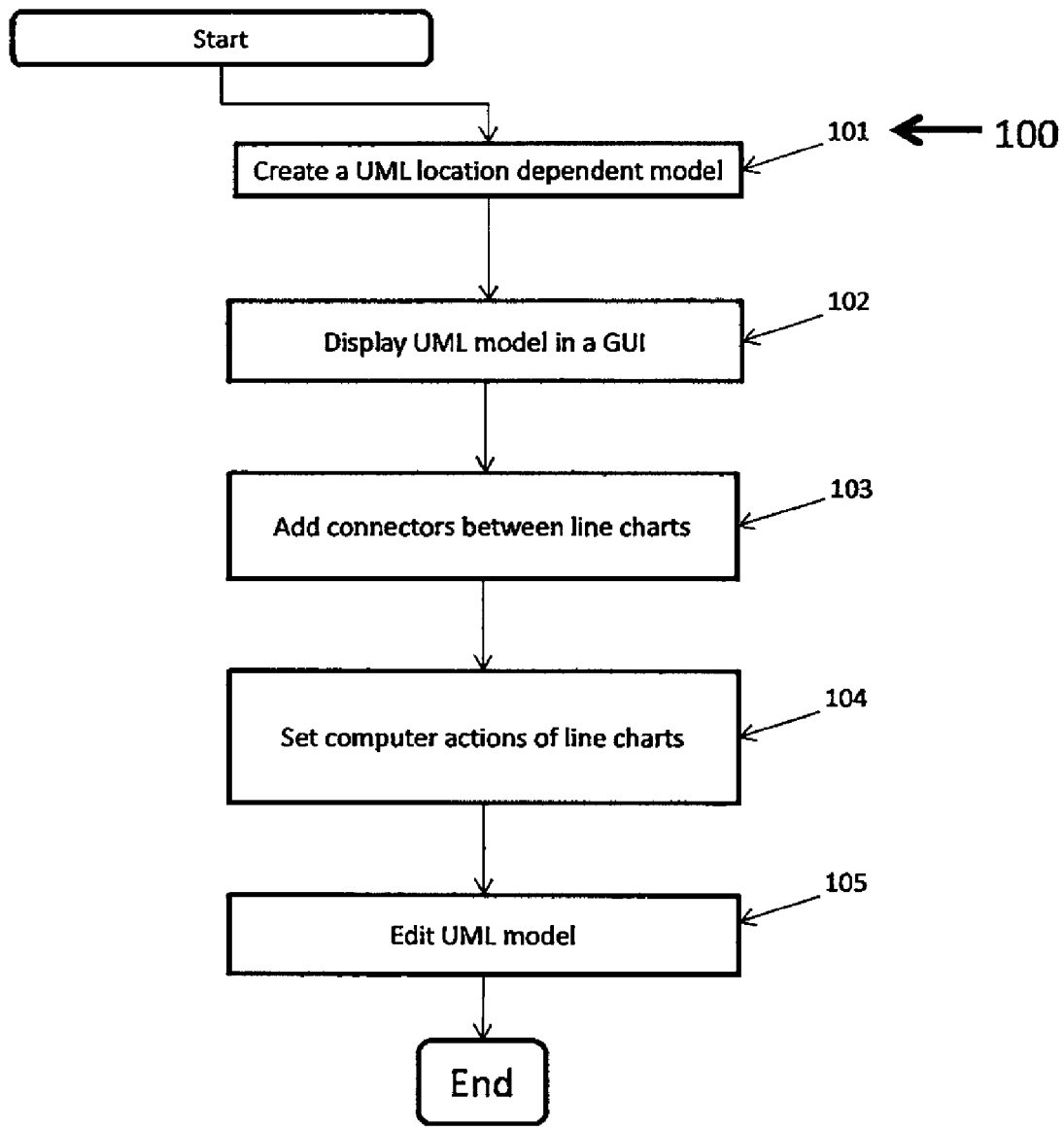
FIG. 2 is a flowchart of an exemplary method for generating a display of a location dependent UML model of a network of interacting computing devices, according to some embodiments of the present invention.

Reference is now made to FIG. 2, a flowchart of an exemplary process 100 for generating and displaying a location dependent UML model, according to some embodiments of the present invention. As shown in 101, a UML location dependent model is created, for example by processor 340 executing code instructions, for instance based on a user input such as graphics editing instructions and/or text inputs, via Graphical User Interface (GUI) 310. As shown in 102, the UML location dependent model is displayed, for example on computer screen 360. The model comprises at least two line charts input by users. Optionally, each line chart models the behavior of a networked computing device. A line chart, also called a line graph, is a graphical representation of a series of data values. In some embodiments of the current invention, each discrete value along the line chart represents a computer action executed by a modeled computer device. Networked computing devices are computing devices capable of sending and receiving messages with each other. The model comprises two axes, a time axis and a distance axis. Optionally, the time axis is horizontal, and the distance axis is vertical. Optionally, user input determines the scale of each axis, for example a centimeter displayed on the distance axis represents a kilometer of geographical distance, and a centimeter displayed on a time axis represents a second.

The line charts are parallel to each other and parallel to the time axis, such that an identical horizontal position along the time axis of each line chart represents the same moment in time. The line charts are offset from each other along the distance axis, where the offset may represent a geographical distance between the locations of the modeled computer devices. Optionally, the line charts are displaced vertically from each other. Optionally, a UML location dependent model may comprise a single line chart and depict the actions executed by a computing device in a specific location.

As shown in 103, connector lines between a pair of line charts may be added by user input. Connector lines indicate communication between a pair of modeled networked computing devices. Optionally, the connector lines have an arrow at one end, indicating a direction of communication, for example sending a message or receiving a message. Optionally, the width of the line and the composition of the line, for example dots, dashes, or a solid line, indicates the type of communication. Types of communications may include voice messaging, text messaging, video messaging, pre defined text alert messages, two way voice calls, two way video calls, group calls, push to talk calls, any other type of one way or two way computer communication.

As shown in 104, the data points on the line charts are set along the time axis, for example by user input via the GUI. As explained above, a line chart comprises a graphical representation of data points connected by line segments.

Optionally, the line chart comprises only vertical and horizontal line segments, where the horizontal line segments are set to discrete values, and vertical line segments connect between adjacent horizontal line segments.

Optionally, according to input from a user every discrete value of a horizontal line segment on a line chart indicates a computer action of the modeled computing device. A computer action is a computing device performing a computer activity, for example sending a computer message to another computing device, receiving a computer message from another computing device, a software event occurring in the computing device, and/or a computer hardware event occurring in the computing device.

As shown in 105, elements of the UML model may be edited by a user, for example via the GUI. The editable elements comprise the scale of the time axis, the scale of the distance axis, the number of line charts, the position of each line chart along the distance axis, the connector lines between pairs of line charts, and the values of the line segments within each line chart.

Optionally, text may be added as a label to each element mentioned above, to signify what each element represents. For example, a line chart modeling the behavior of a Smartphone may be labeled "end user Smartphone". A line chart may be additionally labeled, for example "500 meters from event" to indicate modeling of the behavior of a computing device located 500 meters an event. Optionally, a value of a line chart may be labeled, for example "receiving message", another value may be labeled "transmitting video message".

Optionally, a line chart may comprise only a horizontal segment. Such a line chart may be introduced by a user via a GUI to indicate a specific distance, for example by labeling the line chart "500 meters from event A". In this way, line charts on either side will be known to be either more or less than 500 meters from "event A".

Optionally, the UML location dependent model may be stored in a data structure, for example in memory 330. Optionally, the data structure may be displayed by a computer system onto a screen, for example displayed on device 360 by computer system 300.

Optionally, the location dependent UML model may be an extension to any software or computer system modeling language. For example, the location dependent UML model may be an extension to Systems Modeling Language (SysUML), Open Management Group Systems Modeling Language (OMG SysUML), Specification and Description Language (SDL), Extended Enterprise Modeling Language (EEML), and/or any other software or computer system modeling language.

Figure 3:
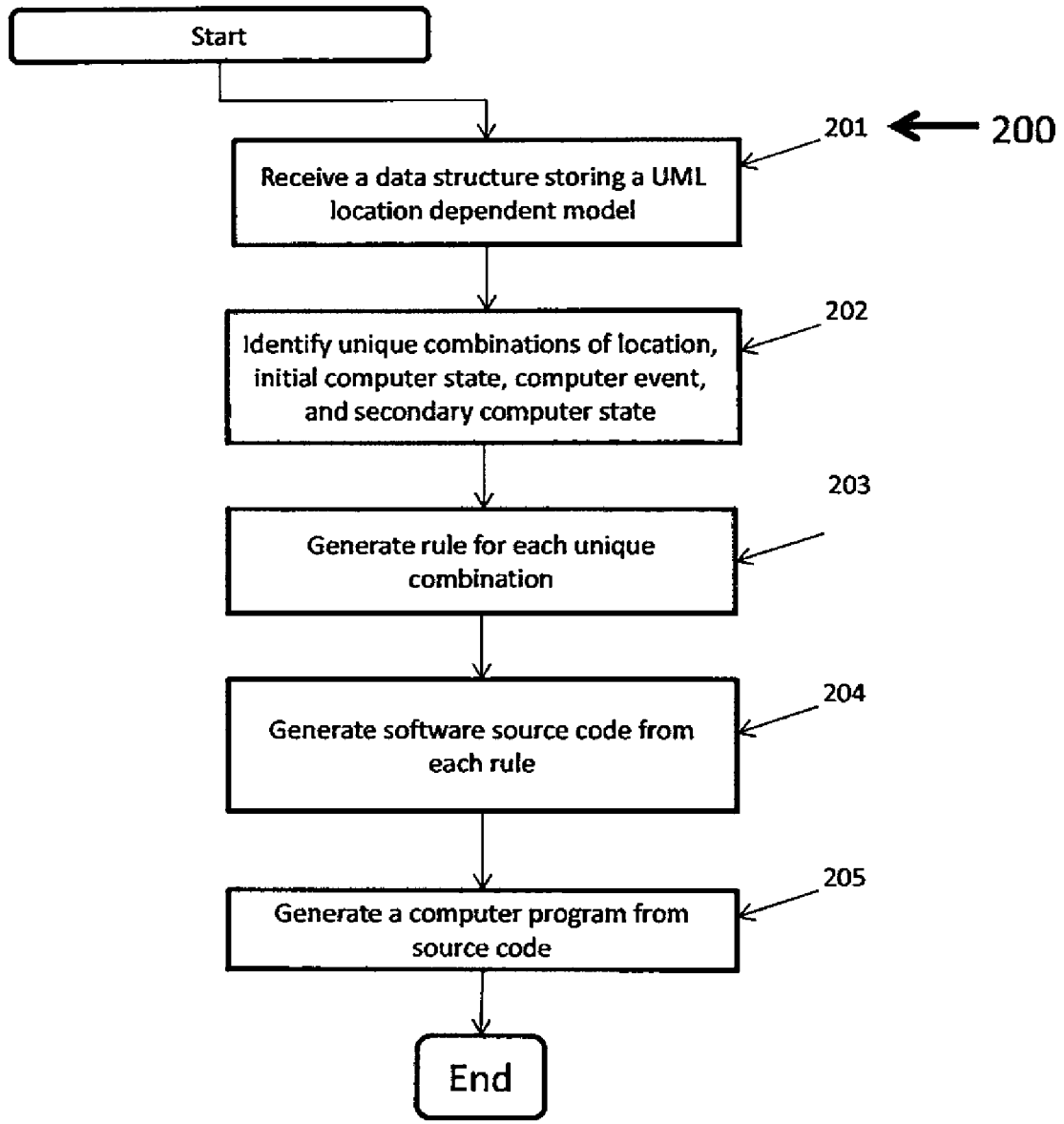
FIG. 3 is a flowchart of an exemplary process for automatically generating a source code from a data structure comprising data for displaying a location dependent UML model of a network of interacting computer devices, according to some embodiments of the present invention.

Reference is now made to FIG. 3, a flowchart of an exemplary process 200 for automatically generating a source code from a data structure configured to store a location dependent UML model, according to some embodiments of the present invention. Process 200 is executed by one or more processors on a computing device, for example computer system 300 and/or as a computer utility or as a computer program integrated into a UML development environment.

As shown in 201, a data structure is received by the computing device. The data structure may be received from a computer memory or transferred from a remote computing device via a computer network, for example an intranet, or input by a user via a GUI. The data structure comprises information for displaying a location dependent UML model.

As shown in 202, the data structure comprises a digital representation of a graphical display that models the location dependent behavior of a computing device. For each modeled computing device the data structure comprises: a geographical location, at least one line chart, at least one initial computer action, at least one computer event, and at least one secondary computer action.

As shown in 203, a rule is generated to associate each unique combination of location, initial computer action, and computer event with an associated secondary computer action. The rule is automatically generated by code executing on a processor, for example processor 340 on computing system 300.

As shown in 204, each rule is used to automatically generate a software source code by a code executing on a processor. The software source code comprises conditional statements that when executed test for the existence of each unique combination of location, initial computer action, and computer event. When a matching combination is found, flow control of the source code is directed to instructions that when executed perform the associated secondary computer action identified in the rule.

Optionally, as shown in 205, the one or more software source codes associated with a modeled computing device are assembled into a computer program by a code executing on a processor. A computer program is a source code that may be compiled or interpreted into a machine code that may execute till completion on a processor.

Figure 4:
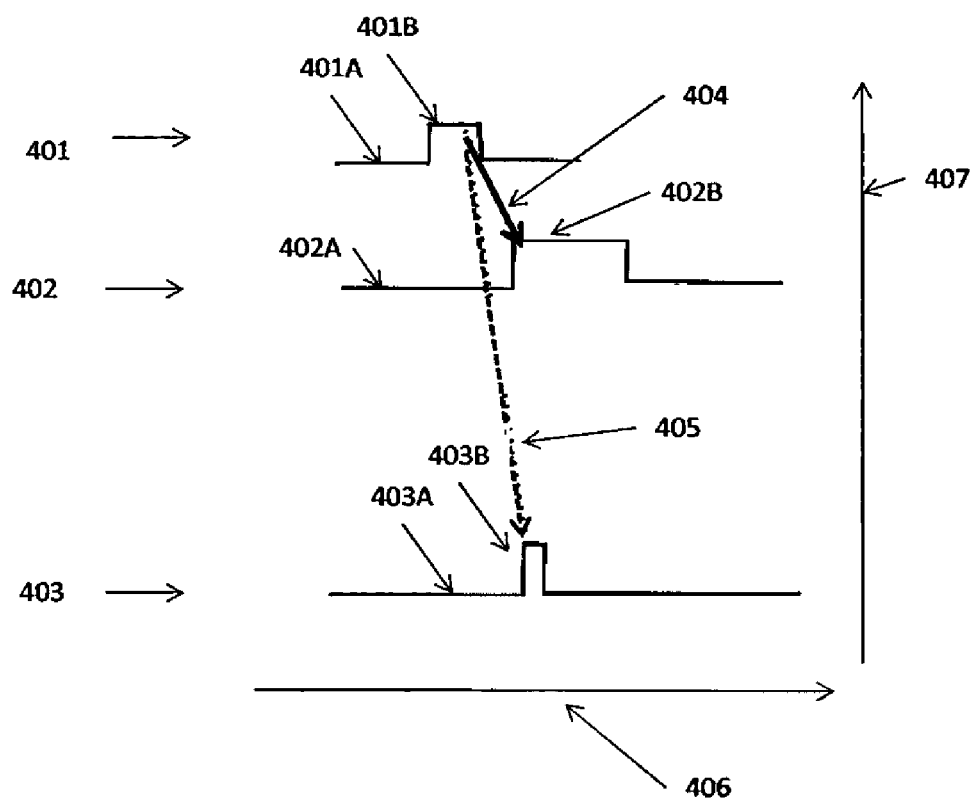
FIG. 4 is an exemplary display of a UML location dependent model, according to some embodiments of the present invention.

Reference is now made to FIG. 4, an exemplary display of a UML location dependent model. As shown in UML location dependent model 400, the use case is based on the scenario where a policeman receives a video message when located within 500 meters of an event, and a text message when located more than 500 meters from an event.

As shown in 401, the line chart models behavior of a computer device that sends notification messages of events. Line charts 402 represent a policemen equipped with a computing device located within 500 meters of an event, and line chart 403 represents a policemen equipped with a computing devices located beyond 500 meters of an event. 404 represents a streaming video sent to the policemen within 500 meters, and 405 represents a text message sent to the policemen beyond 500 meters from the event. 406 is the time axis, and 407 is the distance axis.

401 models the location based decision making process of a software code executing on a computing platform, referred to herein as a decision platform. As shown in 401A, the lower value of line chart 401 represents an idle state of the decision platform, and as shown in 401B, the elevated value of line chart 401 represents a computer event occurring that requires the decision platform to initiate communications with police officers 401 and 402.

As shown in 402A, the lower value of line chart 402 represents an idle state of a police officer's computing device, and as shown in 401B, the elevated value of line chart 402 represents the computing device action of receiving a video message.

As shown in 403A, the lower value of line chart 403 represents an idle state of a police officer's computing device, and as shown in 403B, the elevated value of line chart 403 represents the computing device action of receiving a text message.

In FIG. 4, the location of the policemen 402 relative to the event impacts the actions of the decision platform. The location of the decision platform itself does not impact the actions. For example, 401 may be located in a secured location in a different city. In this example, the decision platform has knowledge of the location of the police officers 401 and 402, for example by the police officers computing device comprising a Global Positioning System (GPS) device and executing a software code that automatically updates the current location to the decision platform.

Figure 5:
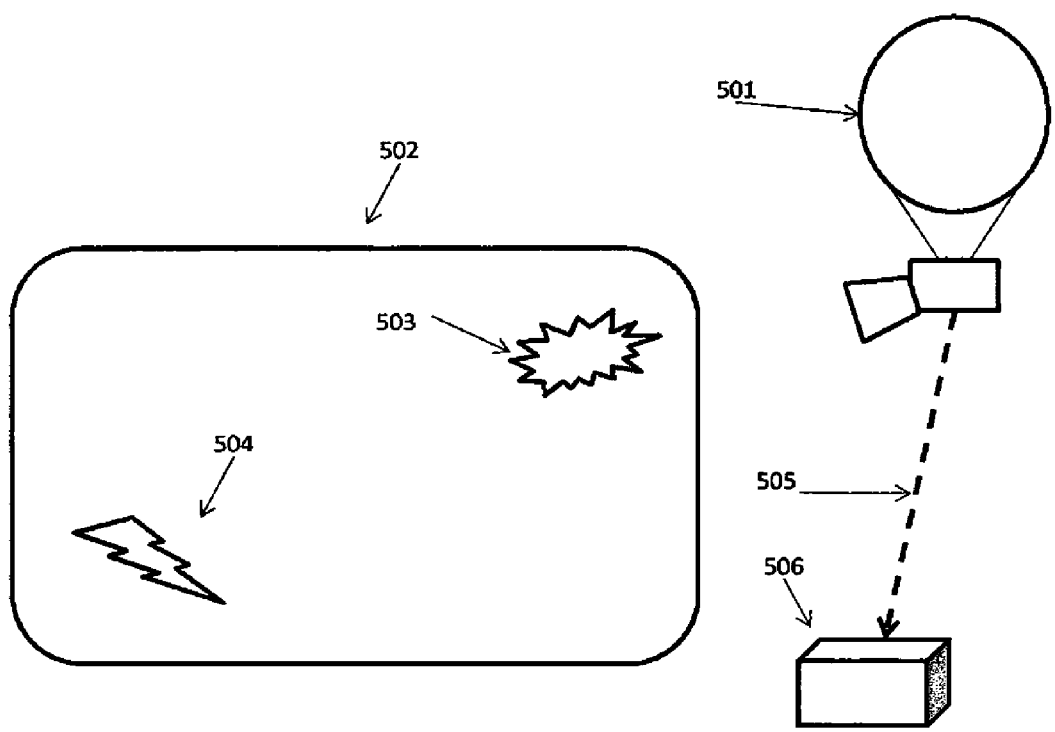
FIG. 5 is an exemplary schematic of a scenario that may be modeled by a UML location dependent model, according to some embodiments of the present invention.

Reference is now made to FIG. 5, a schematic illustration of a scenario that may be modeled by a UML location dependent model. The use case is based on the scenario where two fires break out within the same urban neighborhood, indicating a possible public safety scenario, and the resulting action is notifying a regional fire station.

As shown in 501, a helium balloon equipped with a surveillance camera and wireless communications observes fires 503 and 504 occurring in urban neighborhood 502. As a result, a message 505 is sent to regional fire station 506.

Balloon 501 may comprise a decision, or balloon 501 may communicate with a remote decision platform. In FIG. 5, the location of the fires 503 and 504 determine the actions taken by the decision platform. The location of the observer, in this case balloon 501 does not impact the actions taken by the decision platform. The events, in this case fires 503 and 504, do not themselves comprise computing devices.

Figure 6:
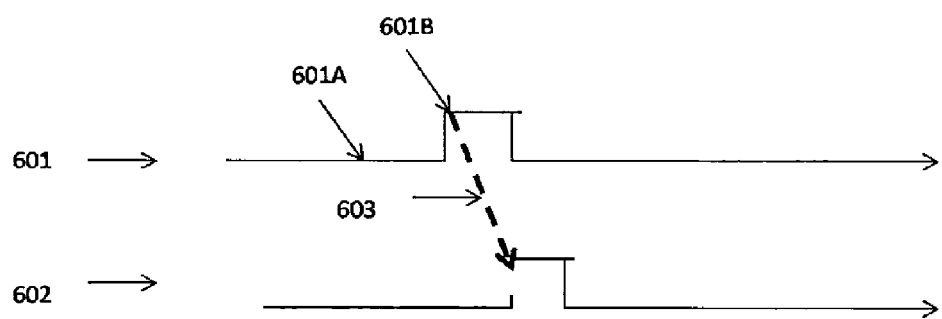
FIG. 6 is an exemplary display of a UML location dependent model based on the scenario shown in FIG. 5, according to some embodiments of the present invention.

Reference is now made to FIG. 6, an exemplary display of a UML location dependent model based on the scenario illustrated in FIG. 5. Line chart 601 represents the decision platform connected to balloon 501, and line chart 602 represents the regional fire station 506. Line 603 represents the message sent by balloon 501 to regional fire station 506. As shown in 601A, the lower value of line chart 601 represents an idle state of the decision platform connected to balloon 501, and as shown in 601B, the elevated value of line chart 601 represents the computing device action of sending a message.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant computing systems will be developed and the scope of the terms computer systems, computing device, and networked device are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of automatically generating and storing a data structure for displaying a Unified Modeling Language (UML) model of behavior of a network of computing devices, said behavior dependent on location of said computing devices, comprising:
    creating a UML model comprising a plurality of line charts arranged in parallel to a time indicating axis;
    displaying said UML model in a graphical user interface (GUI) displayed on a screen;
    setting a plurality of values along each of said line charts; wherein each one of said values indicative of a computer action;
    adding to said displayed UML model a plurality of connectors, each one of said plurality of connectors connects a pair of line charts selected from said plurality of line charts, each one of said plurality of connectors is indicative of a message transmitted between two entities represented by respective said pair;
    wherein a distance between each two line charts of said plurality of line charts in said UML model maps a geographical distance therebetween; and
    wherein said distance and said value and said plurality of connectors are editable according to at least one user input indicative of a selection of an area of said displayed UML model.

2. The method of claim 1, wherein each one of said plurality of line charts models said behavior of a corresponding computing device from said network of computing devices.

3. The method of claim 1, wherein each one of said computer action comprises at least one member of a group of computer events occurring within said corresponding computing device, consisting of: a software event, a hardware event, a computer message received from another computing device, a computer message sent to another computing device.

4. The method of claim 1, wherein said display lines may be solid lines, dotted lines, dashed lines, bold lines, and/or other types of lines, wherein each type of line represents one or more of a plurality of interactions comprising voice messaging, text messaging, video messaging, pre defined alert messages, two way voice calls, two way video calls, group calls, push to talk calls, and/or any other type of one way and/or two way communication.

5. The method of claim 1, further comprising automatically generating and storing said data structure wherein said data structure is configured to store digital representation of said plurality of line charts, said distance, said plurality of connectors, and said values.

6. The method of claim 1, wherein said UML model is an extension to at least one modeling language selected from a group of modeling languages consisting of: Systems Modeling Language (SysML), Open Management Group Systems Modeling Language (OMG SysML), Specification and Description Language (SDL), Extended Enterprise Modeling Language (EEML), and any other software or computer system modeling language.

7. A system to automatically generate and store a data structure for displaying a Unified Modeling Language (UML) model of location dependent behavioral of a network of computing devices, comprising:
    a graphical user interface (GUI) displayed on a screen for communicating with a user;
    one or more non-transitory computer-readable storage medium;
    one or more display devices for presentation of said GUI;
    one or more user input devices;
    code instructions stored on at least one of said one or more storage mediums;
    one or more processors for executing said code instructions coupled to said one or more storage mediums;
    said code instructions comprising:
    code instructions to create a UML location dependent model comprising a plurality of line charts arranged in parallel to a time indicating axis;
    code instructions to display said UML location dependent model;
    code instructions to set a plurality of values along each of said plurality of line charts;
    code instructions to add to said displayed UML model a plurality of connectors, each one of said plurality of connectors connects a pair of line charts selected from said plurality of line charts, each one of said plurality of connectors is indicative of a message transmitted between two entities represented by respective said pair;

wherein a distance between each two line charts of said plurality of line charts in said UML model maps a geographical distance therebetween; and wherein said distance and said value and said plurality of connectors are editable according to at least one user input indicative of a selection of an area of said displayed UML model;

wherein each one of said values indicative of a computer action.

8. The system of claim 7, wherein said code instructions comprising code instructions to receive a user input comprising said plurality of line charts.

9. The system of claim 8, wherein said user input may be received via said GUI or from a data structure stored in a computer memory.

10. The system of claim 8, wherein said user input is received from at least one member of a group consisting of: a touch screen, a mouse, a trackball, a keyboard, a touch screen implemented keyboard, and any other computer input device.

11. The method of claim 5, wherein each of said plurality of line charts said values along said plurality of line charts models a computer action of a corresponding computing device from a network of interconnected computing devices.

* * * * *